United States Patent [19]

Beaverton et al.

[11] Patent Number: 5,210,854

[45] Date of Patent: May 11, 1993

[54] SYSTEM FOR UPDATING PROGRAM STORED IN EEPROM BY STORING NEW VERSION INTO NEW LOCATION AND UPDATING SECOND TRANSFER VECTOR TO CONTAIN STARTING ADDRESS OF NEW VERSION

[75] Inventors: Arthur J. Beaverton, Maynard, Mass.; Thomas E. Hunt, Brookline, N.H.

[73] Assignee: Digital Equipment Corporation, Maynard, Mass.

[21] Appl. No.: 366,168

[22] Filed: Jun. 14, 1989

[51] Int. Cl.$^5$ .................................. G06F 12/02
[52] U.S. Cl. ..................... 395/500; 364/DIG. 1; 364/259; 364/259.9; 364/243; 364/245.2; 395/425
[58] Field of Search ... 364/200 MS File, 900 MS File; 395/500, 425

[56] References Cited

U.S. PATENT DOCUMENTS

| | | | |
|---|---|---|---|
| 4,241,405 | 12/1980 | Allocca | 364/466 |
| 4,298,934 | 11/1981 | Fischer | 364/200 |
| 4,327,410 | 4/1982 | Patel et al. | 364/200 |
| 4,403,303 | 9/1983 | Howes et al. | 364/900 |
| 4,503,491 | 3/1985 | Lusthak et al. | 364/200 |
| 4,590,557 | 5/1986 | Lillie | 364/200 |
| 4,663,707 | 5/1987 | Dawson | 364/200 |
| 4,727,480 | 2/1988 | Albright et al. | 364/200 |
| 4,742,483 | 5/1988 | Morrell | 364/900 |
| 4,779,187 | 10/1988 | Letwin | 364/200 |
| 4,787,032 | 11/1988 | Culley | 364/200 |
| 4,791,603 | 12/1988 | Henry | 364/900 |
| 4,803,623 | 2/1989 | Klashka et al. | 364/200 |
| 4,839,628 | 6/1989 | Davis et al. | 340/311.1 |
| 4,853,850 | 8/1989 | Krass, Jr. et al. | 364/200 |
| 4,907,228 | 6/1990 | Bruckert et al. | 364/900 |
| 4,926,322 | 5/1990 | Stimac et al. | 364/200 |
| 4,930,129 | 5/1990 | Takahira | 371/40.4 |
| 4,935,870 | 9/1990 | Burk, Jr. et al. | 364/200 |
| 4,943,910 | 7/1990 | Nakamura | 364/200 |
| 4,984,213 | 1/1991 | Abdoo et al. | 365/230.3 |
| 5,008,814 | 4/1991 | Mathur | 364/200 |
| 5,062,080 | 10/1991 | Goldsmith | 365/230.01 |
| 5,123,098 | 6/1992 | Gunning et al. | 395/400 |
| 5,155,680 | 10/1992 | Wiedemer | 364/406 |

FOREIGN PATENT DOCUMENTS

| | | |
|---|---|---|
| 0137758 | 4/1985 | European Pat. Off. |
| 60-059452 | 4/1985 | Japan |
| 1-073435 | 3/1989 | Japan |
| 1-150297 | 6/1989 | Japan |

Primary Examiner—Thomas C. Lee
Assistant Examiner—Mehmet Geckil
Attorney, Agent, or Firm—Kenyon & Kenyon

[57] ABSTRACT

Firmware resident in electrically erasable programmable read only memory ("EEPROM") can be updated by a user while maintaining the intelligence of a computer system during the updating process by a control logic device. The control logic device decodes address and control signals to provide a hardware partitioning of the firmware resident in the EEPROMs to prevent writing to protected partitions of the firmware. Transfer vectors are used to provide indirect accessing of subroutines resident in the firmware. During an updating process, a new version of a subroutine is stored in a free area in the EEPROMs before the transfer vector pointing to the old version of the subroutine is updated. The window of vulnerability to errors during the updating process is minimized by only updating a page of memory containing the transfer vector that points to the old version of the subroutine after the new version has been stored.

7 Claims, 5 Drawing Sheets

SYSTEM FOR UPDATING PROGRAM STORED IN EEPROM BY STORING NEW VERSION INTO NEW LOCATION AND UPDATING SECOND TRANSFER VECTOR TO CONTAIN STARTING ADDRESS OF NEW VERSION

FIELD OF THE INVENTION

This invention relates to a digital computer memory system and, more particularly, to a digital computer memory system in which firmware resides in electrically erasable programmable read-only memory. The invention provides an efficient means whereby firmware can be updated in the field by a user while maintaining fully functional firmware in the system and an effective means to recover from failure conditions which may occur during the updating process.

BACKGROUND OF THE INVENTION

General purpose digital computers utilize a wide variety of programs to perform various tasks. A computer program is a series of instructions or statements, in a form which is executable by a computer, to achieve a certain result. In a computer system, these programs may be, among others, part of the operating system, compilers, editors or specific application programs. Such computer programs are also referred to as software.

Firmware is a form of a computer program which embodies instructions or data stored in a fixed means, i.e., the instructions or data stored remain intact without the need of a power source, such as a read-only memory ("ROM"), a programmable read-only memory ("PROM") or an erasable programmable read-only memory ("EPROM"), as opposed to instructions or data stored in a random access memory ("RAM"). Once the firmware is stored in one of the aforementioned fixed means, it cannot be written over without removing the integrated circuit chip in which the firmware is stored. Thus, if errors in the firmware are discovered once a computer system has been shipped to a customer, a field service technician would be required to correct the errors. The technician would have to power down the system to install either a new chip or a new circuit board containing a new chip including the corrected firmware. This procedure can be expensive and time consuming.

The advent of electrically erasable programmable read-only memory ("EEPROM") has obviated the need to remove a memory chip containing firmware with errors. An EEPROM is a read-only memory that can be erased and reprogrammed by electrical signals to store new firmware without removing the EEPROM from the circuit board or powering down the computer system. In typical EEPROMs, each location in the EEPROM can be erased separately. The drawback of typical EEPROMs is that they are on the order of one fourth the density of EPROMS. The low density of typical EEPROMs is attributable to the technology utilized to make these EEPROMs. Thus, a greater number of EEPROM chips would be required to provide sufficient storage capabilities.

As a result, present computer systems using EEPROMs typically do not use all EEPROMs for storing firmware. Such systems generally utilize some combination of EEPROMs and ROM, PROM, or EPROM to achieve full functionality and sufficient storage capabilities. Furthermore, present computer systems which protect an area of the firmware from being updated also generally use a combination of EPROMs and EEPROMs. The EPROMs are used to store the firmware that is protected from the updating process.

The above described computer systems overcome the low density problem of the EEPROMs but lose the ability to update a large percentage of the firmware in the field since typically, only a small amount of the firmware is stored in the EEPROM. Most of the operable code is stored in EPROMs. Thus, updates to the firmware resident in the EPROM would still require a field service technician to either replace the EPROM or install a new circuit board containing EPROM with the updated firmware.

Recent advances in technology have obviated the disparity in densities between EEPROMs and EPROMs. Now, the entire system firmware can reside in EEPROMs. While these advances eliminate the necessity for using a combination of EPROMs and EEPROMs for firmware storage, they have also raised the problem of how to maintain a minimum amount of firmware constant in the system. Thus, without providing some safeguards, a user could inadvertently or intentionally corrupt the firmware when performing updates to the extent that a total loss of system intelligence could result. Accordingly, the services of a skilled technician would still be required to perform firmware updates in the field to prevent such corruption of the firmware.

SUMMARY OF THE INVENTION

The present invention provides a computer memory system utilizing only EEPROMs in which to store firmware wherein an end user can perform firmware updates without corrupting the firmware. The invention also provides a failure recovery mechanism to insure that the user will have fully functional firmware if certain failure conditions occur during the updating process. The user need not be a skilled service technician but rather an everyday computer user.

Generally, the present invention comprises an EEPROM array coupled by a bus arrangement to a central processing unit (hereinafter "CPU"). The CPU is also coupled to a system console through which an operator can communicate directly with the CPU. A control logic device is intercoupled between the EEPROM array and the CPU. The control logic device generates the signals which enable the EEPROM to be erased and reprogrammed under the control of the CPU.

The present invention provides for the firmware resident in the EEPROM to be hardware partitioned into protected areas and unprotected areas. The partitioning of the firmware prevents a user from writing over selected partitions of the firmware resident in the EEPROM. This insures that a minimum amount of firmware is constant in the system, thereby preventing the ordinary user from corrupting the firmware to the extent that a total loss of system intelligence results. The EEPROMs maintain a minimal bootstrap to enable either the repeating of the upgrade process upon power failure or simply bootstrapping a known good image of the firmware upon the load of faulty firmware.

The upgrade is implemented by operating the CPU through the console to generate the EEPROM addresses and control signals and thereby transmit the firmware to the EEPROM for storage in the corresponding EEPROM addresses. A portion of the EE- PROM addresses generated by the CPU are transmitted to the control logic device. The CPU also generates and transmits control signals to indicate that a firmware update is requested. The control logic device ascertains whether the addresses generated by the CPU are in an area of the EEPROM which is a protected or unprotected partition. If the partition is unprotected, the control logic device generates the appropriate signals to enable the loading of the firmware into the EEPROM.

The present invention also provides a failure recovery mechanism to insure that during firmware upgrades the user will have functional firmware if a failure occurs during the updating process. Two such potential failures are power failure during the upgrade process or the loading of faulty code. The invention minimizes the susceptibility of the computer system to such failure conditions through the partitioning of the firmware and the use of software constructs known as transfer vectors and jump tables. During the updating process, the new version of the firmware is written to memory. It is not until the entire updated version of the firmware is stored that the pointers to the old version of the firmware, maintained in the transfer vectors and jump tables, are updated. This procedure minimizes the risk of firmware corruption during the updating process.

Accordingly, the present invention provides a user with the ability to perform field updating of firmware resident in EEPROM without requiring the removal of circuit boards from the computer system or the need for a skilled operator to perform the upgrade. The invention provides a control logic device to maintain a preselected amount of firmware in a protected partition to prevent overwriting by the user and also provides a recovery mechanism that allows a user to either fall back to the previous state of the firmware or when such fall back cannot be done, to retry the update process and reload the new firmware when failures occur during the firmware update.

DETAILED DESCRIPTION

Figure 1:
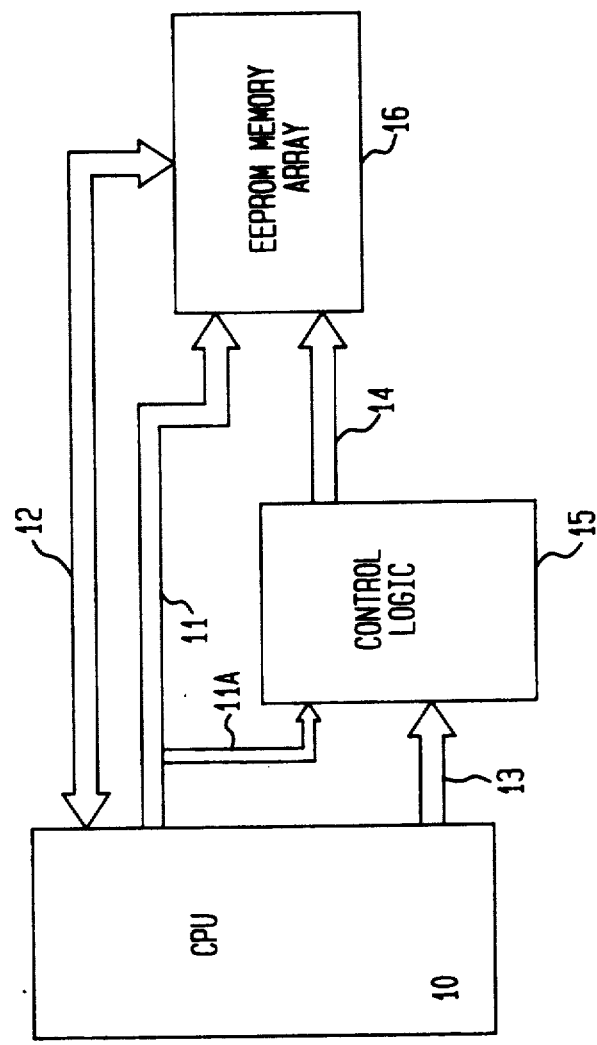
FIG. 1 is a block diagram of a computer system according to the invention.

Referring now to the drawings and initially to FIG. 1, there is illustrated, in block diagram form, a system configuration according to the invention. The system comprises a CPU 10, a control logic device 15 and an EEPROM memory array 16. The CPU 10 is coupled to the control logic device 15 by a bus 13. A plurality of control signals is transmitted by the CPU 10 across the bus 13 to the control logic device 15. A bus 12 is a bidirectional data bus which couples the CPU 10 to the EEPROM memory array 16. The CPU 10 transmits data information across the bus 12 to the EEPROM memory array 16. A bus 11 is an address bus which couples the CPU 10 to the EEPROM memory array 16.

A bus 11A, which comprises a portion of the address bus 11, couples the CPU 10 to the control logic device 15. The control logic device 15 is coupled to the EEPROM memory array 16 by a bus 14. The control logic device 15 transmits a plurality of control signals across the bus 14 to the EEPROM memory array 16.

The CPU 10 generates and transmits various control signals across the bus 13. These signals from bus 13 and the address bits supplied from the bus 11A are decoded by the control logic device 15 to supply control signals including write enable signals via the bus 14 to the EEPROM memory array 16.

Figure 2:
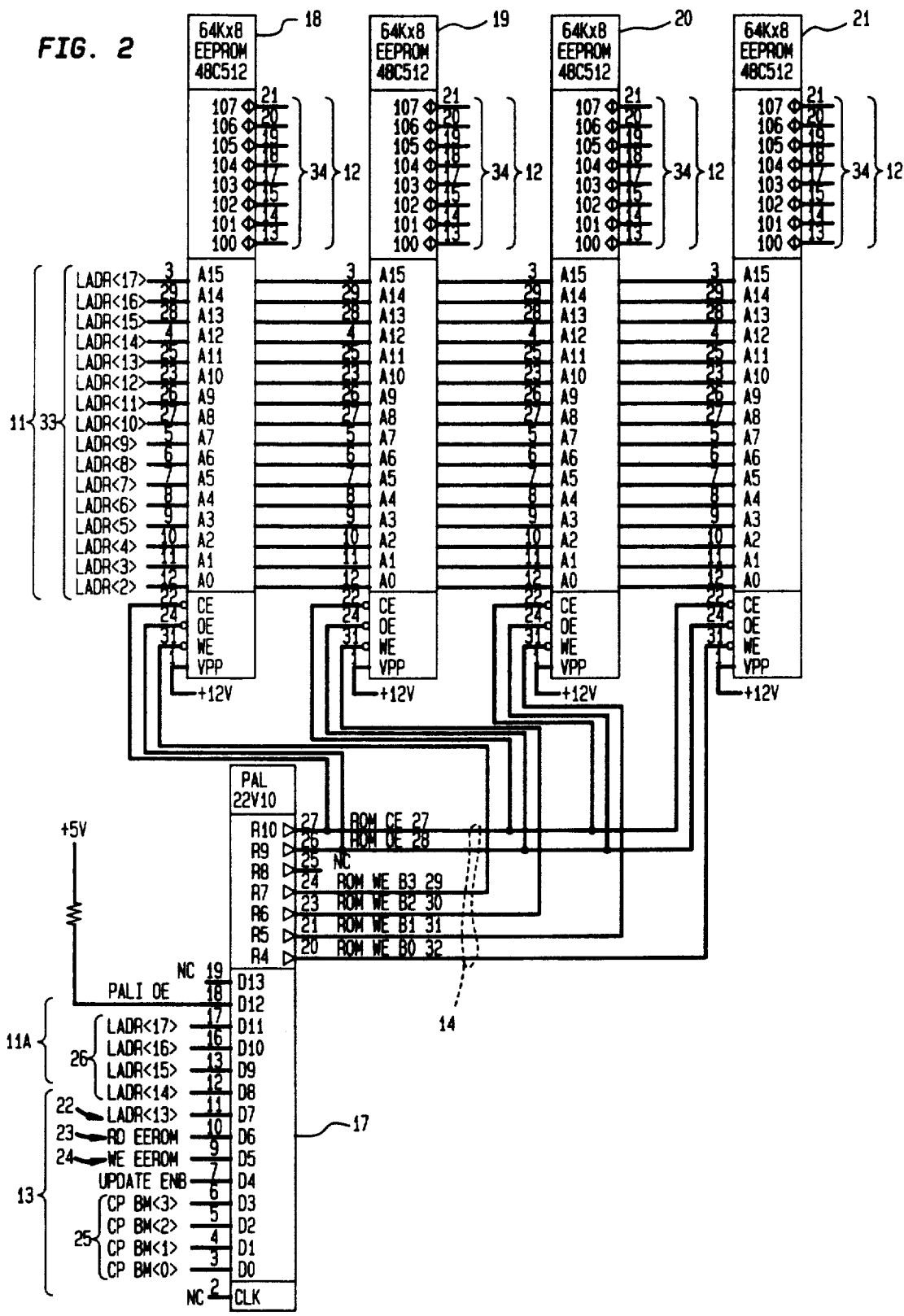
FIG. 2 is a more detailed block diagram of the computer system of FIG. 1.

Referring now to FIG. 2, there is illustrated, a preferred embodiment of the present invention. In this preferred embodiment, the control logic device of FIG. 1 is a programmable array logic chip (hereinafter "PAL") 17, for example, a 24 pin AmPAL22V10 manufactured by Advanced Micro Devices. The PAL 17 utilizes a sum-of-products (AND-OR) logic structure, allowing logic designers to program custom logic functions. The PAL 17 is programmed to accept twelve input signals and to generate six output signals. The CPU 10 of FIG. 1 is coupled to the PAL 17 by the bus 11A and the bus 13. The CPU 10 transmits twelve input signals to the PAL 17 across the bus 11A and the bus 13. The CPU 10 is coupled by the bus 11 and the bus 12 to the EEPROM memory array 16. The EEPROM memory array 16 comprises four 64K × 8 EEPROMS 18, 19, 20 and 21. The four EEPROMs are organized to provide a 32 bit wide data word. Each of the EEPROMs 18, 19, 20 and 21 have a chip enable, output enable, and a write enable input. This preferred embodiment of the present invention utilizes EEPROMs model number 48C512 manufactured by SEEQ Technology. The 48C512 EEPROMs 18-21 are referred to as Flash EEPROMs. This type of EEPROM achieves densities equivalent to EPROMs. However, the data stored in such EEPROMs is erased one page (a page is 512 bytes) at a time instead of location by location.

The first group of input signals transmitted from the CPU 10 to the PAL 17, are the address bits, LADR <17:13> 26, transmitted from the CPU 10 over the bus 11A. The LADR 26 signals are supplied to the PAL 17 so it can determine an address range being addressed by the CPU 10 when a write to the EEPROM memory array 16 is requested. The second group of input signals are the CP_BM <3:0> 25 signals which are control signals transmitted by the CPU 10 across the bus 13. These signals are byte masks that indicate which byte(s) of the firmware stored in the EEPROM memory array 16 is to be written. The CPU 10 can also transmit three more control signals, a RD_EEROM 22, a WR_EEROM 23 and an UPDATE_ENB 24 across the bus 13 to the PAL 17. The RD_EEROM 22 is an active low signal which indicates a read memory request. The WR_EEROM 23 is also an active low signal which indicates a write to memory request. The UPDATE_ENB 24 signal is an active low signal which indicates that a firmware update is to be performed.

The UPDATE_ENB 24 signal also provides a physical security check to the update process. In the preferred embodiment of the present invention, the UPDATE_ENB 24 signal is generated by the CPU 10 in response to the setting of a switch on the console. Remote firmware updates to selected partitions referred to as conditionally writable partitions of the firmware are prevented by requiring this switch to be physically set by a user present at the console.

The bus 11 of FIG. 1 is an address bus 33 in the preferred embodiment which couples the four EEPROMS 18, 19, 20 and 21 to the CPU 10. The CPU 10 transmits 16 address signals LADR <17:2> across the address bus 33 to the EEPROMs 18, 19, 20 and 21. The bus 12 of FIG. 1 is a bidirectional data bus 34 in the preferred embodiment which also couples the four EEPROMs 18, 19, 20 and 21 to the CPU 10. The bus 34 comprises 32 signal lines which carry 32 bits of data. The bus 34 is divided into four bytes and thereafter coupled to the EEPROMs. The bytes of data are coupled to the EEPROMs in ascending byte order starting with EEPROM 21, as the least significant byte, then EEPROM 20, EEPROM 19, and EEPROM 18 as the most significant byte.

Figure 3:
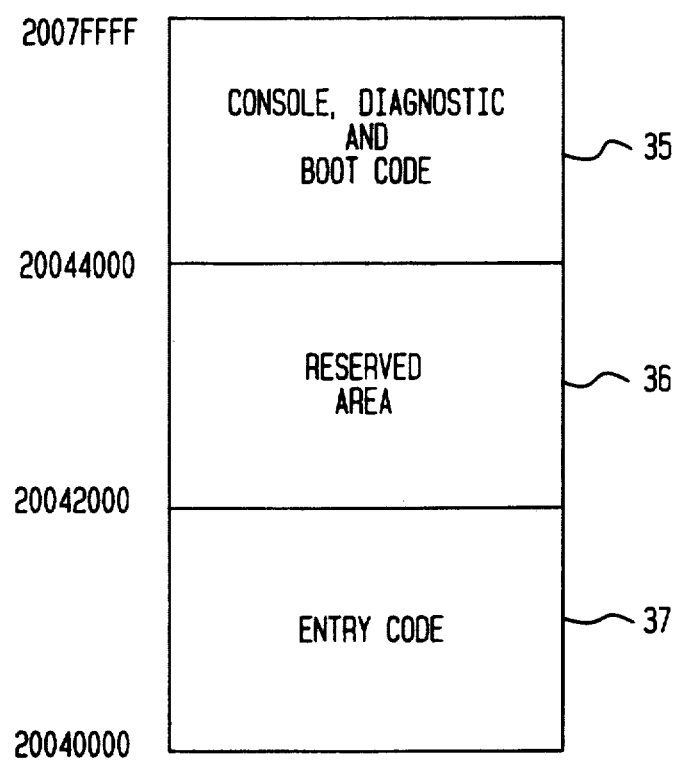
FIG. 3 is a memory map illustrating the partitioning of the EEPROMs of FIG. 2.

The internal organization of the PAL 17 provides for the hardware partitioning of the firmware resident in the EEPROMs. Referring now to FIG. 3, there is shown a memory map of the 64K×32 bit wide EEPROM array 18-21 which illustrates the partitions of the firmware. The firmware is partitioned into three distinct areas. The upper address range (20044000 to 2007FFFF) partition 35 of the firmware is a conditionally writable partition reserved for console, diagnostic and bootstrap code. This partition 35 is conditionally writable by any user with system privileges because of the physical security check described above which must be satisfied to write to this partition. The physical security check requires the CPU 10 to generate the UPDATE_ENB 24 signal in response to the setting of a switch on the system console by a user. This physical security check, therefore, requires the user to be physically present at the system console during the updating of firmware in this partition. The physical security check also prevents a user from remotely initiating a write to this partition. The middle address range (20042000 to 20043FFF) partition 36 is a writable partition reserved for the firmware. This partition can be written to, either locally or remotely, by any user with system privileges. The lower address range (20040000 to 20041FFF) partition 37 is a nonwritable partition reserved for the firmware entry code that can never be written to by a user.

The PAL 17 prevents the updating of the lower address range partition 37 by not generating a write signal to the addressed EEPROM if a write request to that partition is generated by the CPU 10. The PAL 17 implements a set of rules and conditions to accomplish the hardware partitioning of the firmware and thereby render certain areas of the firmware inaccessible to a user. An advantage of utilizing a PAL for the hardware partitioning of the firmware instead of partitioning the firmware in software, is that the PAL prevents users from bypassing the software protection and gaining write access to the protected partitions.

The six output signals of the PAL 17, a ROM_CE 27, a ROM_OE 28, a ROM_W_E B0 32, a ROM_WE_B1 31, a ROM_WE_B2 30, and a ROM_WE_B3 29, are generated in accordance with the conditions set forth in the rules listed below:

$$\text{ROM\_CE} = \text{RD\_EEROM} + \text{WR\_EEROM} \quad (1)$$
$$\text{ROM\_CE.OE} = \text{OE}$$

$$\text{ROM\_OE} = \text{RD\_EEROM} \quad (2)$$
$$\text{ROM\_OE.OE} = \text{OE}$$

$$\text{ROM\_WE\_B0} = \text{CP\_BM0} * \text{WR\_EEROM} * \text{ADDR: [20042000 ... 20043FFF]} + \text{CP\_BM0} * \text{WR\_EEROM} * \text{UPDATE\_ENB} * \text{ADDR: [20044000 ... 2007FFFF]} \quad (3)$$

$$\text{ROM\_WE\_B0.OE} = \text{OE}$$

$$\text{ROM\_WE\_B1} = \text{CP\_BM1} * \text{WR\_EEROM} * \text{ADDR: [20042000 ... 20043FFF]} + \text{CP\_BM1} * \text{WR\_EEROM} * \text{UPDATE\_ENB} * \text{ADDR: [20044000 ... 2007FFFF]} \quad (4)$$

$$\text{ROM\_WE\_B1.OE} = \text{OE}$$

$$\text{ROM\_WE\_B2} = \text{CP\_BM2} * \text{WR\_EEROM} * \text{ADDR: [20042000 ... 20043FFF]} + \text{CP\_BM2} * \text{WR\_EEROM} * \text{UPDATE\_ENB} * \text{ADDR: [20044000 ... 2007FFFF]} \quad (5)$$

$$\text{ROM\_WE\_B2.OE} = \text{OE}$$

$$\text{ROM\_WE\_B3} = \text{CP\_BM3} * \text{WR\_EEROM} * \text{ADDR: [20042000 ... 20043FFF]} + \text{CP\_BM3} * \text{WR\_EEROM} * \text{UPDATE\_ENB} * \text{ADDR: [20044000 ... 2007FFFF]} \quad (6)$$

$$\text{ROM\_WE\_B3.OE} = \text{OE}$$

These output signals are transmitted by the PAL 17 to the EEPROM memory array 16 across the bus 14 when the above conditions are met. For example, referring to rule one, the ROM_CE 27 signal is generated when either the RD_EEROM 22 or (logical OR) the WR_EEROM 23 signal is generated. Similarly, rule two shows that the ROM_OE 28 signal is generated whenever the RD_EEROM 22 signal is generated. The remaining rules produce a write signal for a specific EEPROM addressed by the LADR 26 signals provided the conditions set forth are met. Referring to rule three, the conditions which must be met to generate the write signal, ROM_WE_BO 32, are that the address presented to the PAL 17 on LADR <17:13> 26 be within the address range 20042000 to 20043FFF and (logical AND) the CP_BM0 signal is low and (logical AND) the WR_EEROM 23 signal is low, or (logical OR) the address presented to the PAL 17 on LADR <17:13> 26 be within the address range 20044000 to 2007FFFF and (logical AND) the CP_BM0 signal is low and (logical AND) the WR_EEROM 23 and (logical AND) the UPDATE_ENB 24 signals are low. It is implicit in the conditions set forth in rule three that a write to an address within the address range of 20040000 to 20041FFF will never be performed since such write is effectively inhibited. The other write request signals, the ROM_WE_B3 29, ROM_WE_B2 30, and ROM_WE_B1 31, are similarly generated. The conditions set forth in the rules three through six to generate the write signals are identical with the exception of the CP_BM 25 signals. The CP_BM 25 signals are byte mask signals that determine which output write signal is generated. For example, if CP_BM <2> is generated, then ROM_WE_B2 30 is generated provided the other conditions listed in rule five are met.

In summary, to cause the PAL 17 to generate a write enable signal for an address within the address range of 20042000 to 20043FFF, the CPU 10 must generate a write control signal and an address within the specified address range. Similarly, the CPU 10 must generate a write control signal, an update enable signal, and an address within the specified address range to cause the PAL 17 to generate a write enable signal to store data at an address within the address range of 20044000 to 2007FFFF. The CPU 10 controls which EEPROM of the EEPROM memory array is written by generating the byte mask signal(s) for the EEPROM to be written. The PAL 17 will never generate a write enable signal to write data to an address within the address range of 20040000 to 20041FFF. This is a protected area of the firmware which can never be updated.

The ROM_CE 27 signal output by the PAL 17 is coupled to the chip enable input of each of the EEPROMs. The ROM_OE 28 signal output by the PAL 17 is coupled to the output enable input of each of the EEPROMs. The ROM_WE_B3 29, ROM_WE_B2 30, ROM_WE_B1 31, and ROM_WE_B0 32 signals output by the PAL 17 are coupled respectively to the write enable inputs of EEPROM 18, EEPROM 19, EEPROM 20, and EEPROM 21.

The hardware partition of the firmware provided by the PAL 17 in the present invention prevents unauthorized updates of the protected partition of the firmware resident in the EEPROMs and maintains enough intelligence so that the EEPROMs can be successfully updated. If a firmware error is present in the lower partition 37, then previously described methods of updating must be used. The remaining partitions, the middle address range partition 36 and the upper address range partition 35 are updatable by a user. It is in partitions 36 and 35 that the system firmware resides.

To start the update process, the UPDATE_ENB 24 input to the PAL 17 is driven low by the CPU 10. The PAL 17 can then issue a write request by setting WR_EEROM 23 low, providing the address of the location in the EEPROM on the LADR 33 lines to the EEPROMs and the LADR 26 lines to the PAL 17 and setting the CP_BM 25 lines low to indicate which EEPROM(s) is to be written. The PAL 17 interprets the input signals in accordance with the conditions set forth in the rules to determine if the write request is to an accessible area in the firmware or a protected area as indicated by the address presented on LADR <17:13> 26. If the write request is within the protected area of the firmware the PAL 17 does not generate an output signal and, therefore, the write is blocked. If, however, the write request is outside the protected area, the PAL 17 generates a ROM_WE signal to the respective EEPROM(s) to store the data present on the data bus 34 into the EEPROM(s). As discussed above, the PAL 17 determines which EEPROM is to be written by the CP_BM 25 signals.

The present invention also provides an effective means to maintain the integrity of the system firmware during the updating process. The invention prevents a total loss of firmware functionality that would render the system inoperable by reducing a "window of vulnerability" to errors. The window of vulnerability is the time period during the updating process when the firmware can be corrupted by a failure. This window is reduced by updating the EEPROMs one page at a time in combination with the use of software constructs known as transfer vectors and jump tables.

The subroutines resident in the firmware can be utilized by software which is stored in other areas in memory in the computer system of the present invention. Transfer vectors are used to provide a level of indirect addressing to these subroutines. These vectors provide a valuable means to maintain the accessibility of a subroutine resident in the firmware to the rest of the system software routines when the firmware is updated. This accessibility is maintained without affecting the other software routines, thus, an update of the firmware is transparent to the rest of the system.

To use a subroutine in firmware, the software routine calls the transfer vector which causes the execution to start at the beginning of the subroutine. To maintain the accessibility of these subroutines, the transfer vectors are stored in the nonwritable area of the EEPROMs. Thus, two levels of indirect addressing must be provided by utilizing two transfer vectors to access a subroutine. One vector is stored in the protected partition of the firmware to keep its address constant while the second vector is stored in an unprotected partition so it can be updated. A group of the second transfer vectors are stored in the same page of memory for reasons set forth below.

Figure 4:
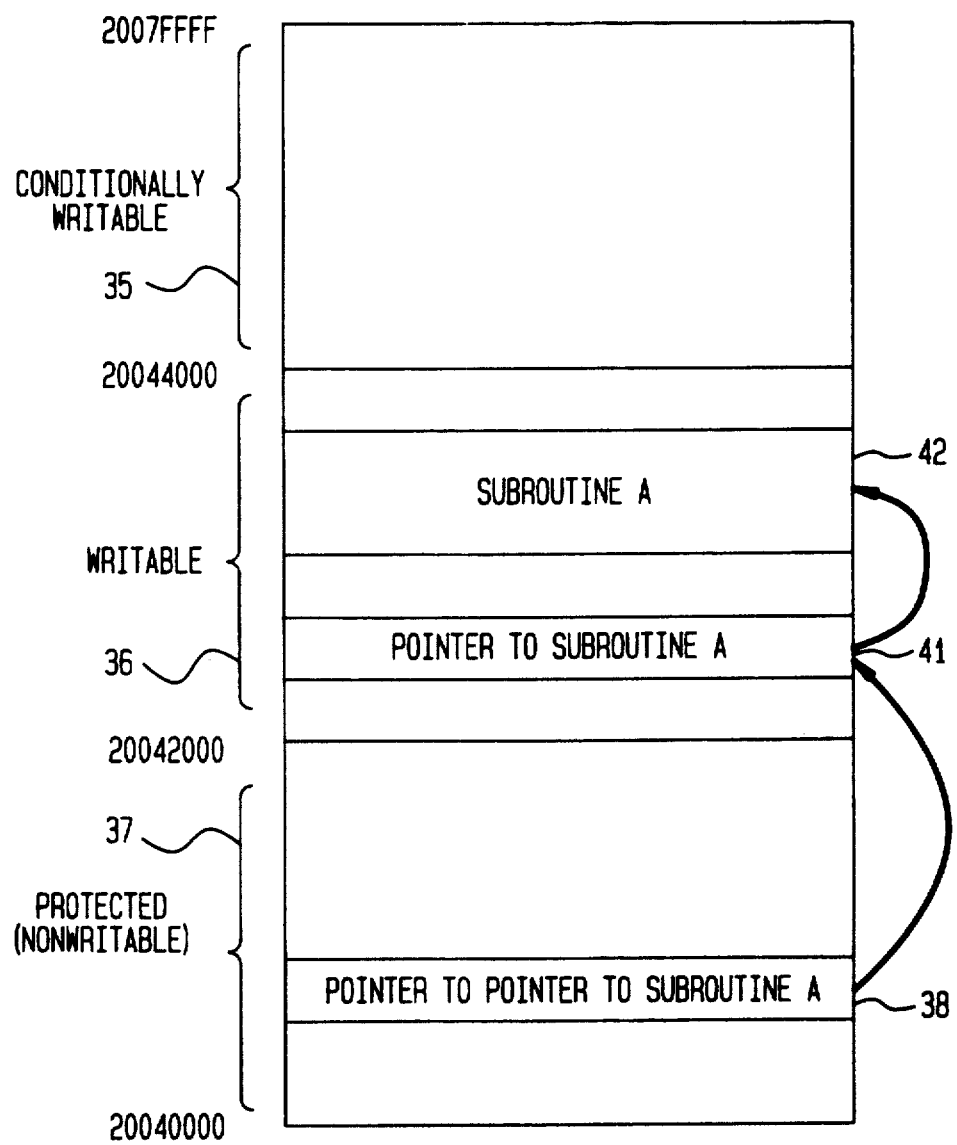
FIG. 4 is a memory map of the EEPROMs illustrating the locations where a subroutine and transfer vectors are stored in the firmware.

Referring now to FIG. 4, there is illustrated, in the memory map of FIG. 3, how transfer vectors are used in the present invention. The transfer vector 38 is stored in the protected partition 37 of the firmware. Since the address of the vector 38 is fixed, updates to a subroutine which it points to will not affect its starting address, and therefore, be transparent to the rest of the system. Vector 38 contains the address of transfer vector 41 which resides in the writable partition 36 of the firmware. The vector 41 contains the starting address of a subroutine A 42. Thus, a software routine which wants to execute subroutine A 42, obtains access to it by addressing the fixed address of vector 38 which points to vector 41 which points to the starting address of subroutine A 42.

Figure 5:
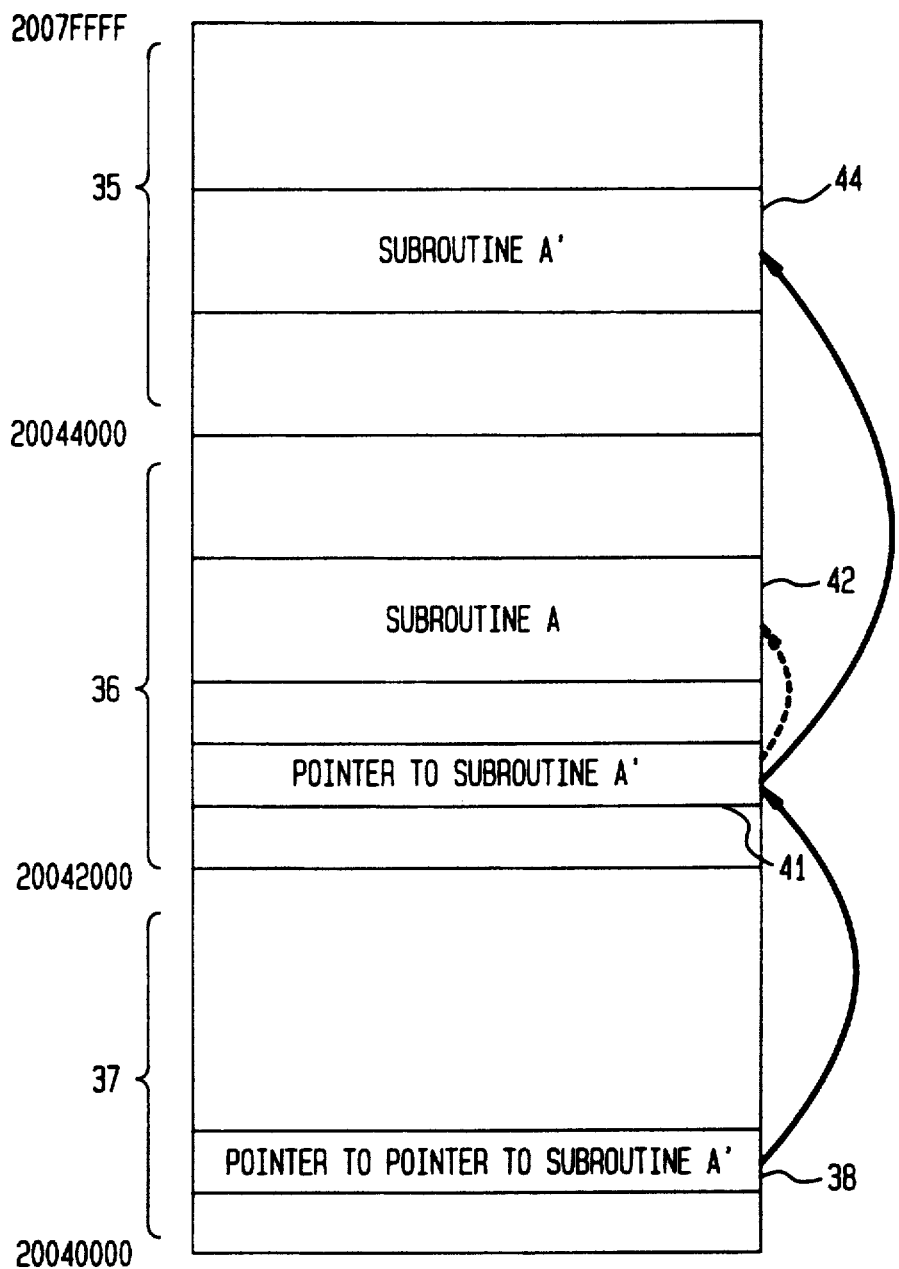
FIG. 5 a memory map of the EEPROMs illustrating the locations where a first and second version of a subroutine and transfer vectors are stored in the firmware during and after updating.

Referring now to FIG. 5, there is illustrated in the memory map of FIG. 3, the process of updating the firmware. As shown, the location of transfer vectors 38 and 41 and subroutine A 42 are unchanged. The CPU 10 stores the new version of subroutine A 42, subroutine A' 44, in the conditional write partition 35 of the firmware. The process of storing the subroutine A' 44 could be on the order of seconds depending on how much memory subroutine A' 44 occupies. If, at anytime during the storing of subroutine A' 44 an error occurs, i.e., a power failure, the integrity of the firmware will not be effected since subroutine A 42 has not been erased.

Once the subroutine A' 44 is successfully stored, the next step is to update vector 41 to point to subroutine A' 44 instead of subroutine A 42. This portion of the updating procedure is critical. The preferred embodiment of the present invention effectively minimizes the window of vulnerability by storing all transfer vectors in the writable partition of the firmware in one page of memory, thus requiring only one page of the firmware in which vector 41 resides to be erased and updated. Thus, the invention reduces the window of vulnerability to the lowest time period that current technology allows. Once the vector 41 is updated to point to subroutine A' 44, the update process is complete and the area of memory subroutine A 42 is stored becomes free space.

Accordingly, the subroutine A 42 can be updated and the window of vulnerability minimized by simply copying the new version of subroutine A 42 into the conditional write partition 35 of the firmware without erasing the old version of subroutine A 42, and updating vector 41 after the new subroutine has been stored.

The above described preferred embodiment of the invention is meant to be representative only, as certain changes may be made therein without departing from the clear teachings of the invention. Accordingly, reference should be made to the following claims which alone define the invention.

What is claimed is:

1. A digital computer memory system comprising:
   an electrically erasable programmable read-only memory containing firmware, having a plurality of address and data inputs and a plurality of locations, each location having an address, and a control input which permits writing to the electrically erasable programmable read-only memory, the electrically erasable programmable read-only memory is partitioned into a protected area and an unprotected area, the unprotected area having a conditionally writable area;
   a central processing unit having a plurality of data outputs, a plurality of address outputs, a control output and an update enable output;
   an address bus coupling the plurality of address inputs in the electrically erasable programmable read-only memory to the plurality of address outputs of the central processing unit;
   a data bus coupling the plurality of data inputs in the electrically erasable programmable read-only memory to the plurality of data outputs of the central processing unit; and
   a control logic device having a plurality of address inputs, a control input, an update enable input and an output, the plurality of address inputs coupled to at least a portion of the address bus, the output coupled to the control input of the electrically erasable programmable read-only memory, the control input coupled to the control output of the central processing unit, and the update enable input coupled to the update enable output of the central processing unit;
   the control logic device responsive to the control output of the central processing unit and an address transmitted on the at least a portion of the address bus, generating a write enable signal when the address is within the unprotected area of the electrically erasable programmable read-only memory and inhibiting the write enable signal when the address is within the protected area of the electrically erasable programmable read-only memory;
   the control logic device generating in response to the control input, the update enable input and the address transmitted on the at least a portion of the address bus, a write enable signal when the address is within the conditionally writable area of the electrically erasable programmable read-only memory and inhibiting the write enable signal when the address is within the protected area of the electrically erasable programmable read-only memory.

2. The digital computer system of claim 1 wherein the electrically erasable programmable read-only memory stores data in the one of a plurality of locations indicated by the address in response to the write enable signal of the control logic device.

3. A method of updating a computer program stored in an electrically erasable programmable read-only memory having a plurality of inputs and a plurality of locations, each location having an address, the electrically erasable programmable read-only memory is partitioned into an unprotected partition and a protected partition, comprising the steps of:
   (a) coupling a central processing unit to the electrically erasable programmable read-only memory via an address bus and a data bus;
   (b) providing a first transfer vector in the protected partition of the electrically erasable programmable read-only memory;
   (c) providing a second transfer vector in the unprotected partition of the electrically erasable programmable read-only memory, the second transfer vector contains an address of a location of the beginning of the computer program, the first transfer vector contains an address of a location in the electrically erasable programmable read-only memory where the second transfer vector is stored;
   (d) initiating an update of the computer program stored in the electrically erasable programmable read-only memory by storing a new version of the computer program in memory locations in the electrically erasable programmable read-only memory that do not contain the old version of the computer program, such that if an error occurs while updating, the old version of the computer program stored in the electrically erasable programmable read-only memory is not affected and the central processing unit can still access the old version of the computer program stored in the electrically erasable programmable read-only memory; and
   (e) after the new version of the computer program is stored in the electrically erasable programmable read-only memory, updating the second transfer vector to contain the starting address where the new version of the computer program is stored in the electrically erasable programmable read-only memory, such that the amount of time required to update the second transfer vector is constant and independent of the amount of time required to store the new version of the computer program in the electrically erasable programmable read-only memory thereby minimizing a window of vulnerability to errors during firmware updates.

4. The method according to claim 3, wherein the step of updating the second transfer vector comprises erasing a page in the electrically erasable programmable read-only memory containing the second transfer vector and storing a new page containing the second transfer vector having the starting address where the new version of the computer program is stored in the electrically erasable programmable read-only memory.

5. A digital computer memory system comprising:

an electrically erasable programmable read-only memory having a plurality of inputs and a plurality of locations partitioned into a protected area and an unprotected area, the electrically erasable programmable read-only memory having a first transfer vector stored in the protected area which contains an address of a location in the electrically erasable programmable read-only memory where a second transfer vector is stored, and a computer program and the second transfer vector containing an address of a location in the electrically erasable programmable read-only memory where the beginning of the computer program is stored, stored in the unprotected area; and a central processing unit coupled to the inputs of the electrically erasable programmable read-only memory initiating an update of the computer program by storing a new version of the computer program in memory locations in the electrically erasable programmable read-only memory that do not contain the old version of the computer program, and after the new version of the computer program is stored, the central processing unit further updates the second transfer vector to contain the starting address where the new version of the computer program is stored in the electrically erasable programmable read-only memory.

6. The digital computer memory system of claim 5 wherein the electrically erasable programmable read-only memory comprise a Flash electrically erasable programmable read-only memory.

7. The digital computer memory system of claim 6, wherein the central processing unit erases a page in the Flash electrically erasable programmable read-only memory containing the second transfer vector and stores a new page containing the second transfer vector having the starting address where the new version of the computer program is stored in the electrically erasable programmable read-only memory.

* * * * *